(12) United States Patent
Faller et al.

(10) Patent No.: US 8,836,653 B1
(45) Date of Patent: Sep. 16, 2014

(54) EXTENDING HOST DEVICE FUNCTIONALITY USING A MOBILE DEVICE

(75) Inventors: Jeremy Faller, Arlington, MA (US); Abraham Murray, Scituate, MA (US)

(73) Assignee: Google Inc., Mountain View, CA (US)

( * ) Notice: Subject to any disclaimer, the term of this patent is extended or adjusted under 35 U.S.C. 154(b) by 114 days.

(21) Appl. No.: 13/171,204

(22) Filed: Jun. 28, 2011

(51) Int. Cl.
*G09G 5/00* (2006.01)

(52) U.S. Cl.
USPC ............... 345/173; 345/1.1; 345/2.1; 345/1.2

(58) Field of Classification Search
USPC ......... 345/179, 180, 181, 182, 183, 504, 156, 345/169, 173, 175; 715/761, 740, 737, 718, 715/249, 863; 709/223, 248
See application file for complete search history.

(56) References Cited

U.S. PATENT DOCUMENTS

| | | | |
|---|---|---|---|
| 4,111,052 A | 9/1978 | Sniderman | |
| 4,786,764 A | 11/1988 | Padula et al. | |
| 5,004,871 A | 4/1991 | Purcell | |
| 5,111,004 A | 5/1992 | Gullman | |
| 5,434,959 A | 7/1995 | Von Ehr, II et al. | |
| 5,565,632 A | 10/1996 | Ogawa | |
| 5,633,471 A | 5/1997 | Fukushima | |
| 5,635,683 A | 6/1997 | McDermott et al. | |
| 5,712,662 A | 1/1998 | Miyazaki et al. | |
| 6,689,965 B1 | 2/2004 | Fleck | |
| 6,801,211 B2 | 10/2004 | Forsline et al. | |
| 6,954,355 B2 * | 10/2005 | Gerstner et al. | 361/679.09 |
| 7,619,616 B2 | 11/2009 | Rimas Ribikauskas et al. | |
| 7,685,257 B2 | 3/2010 | King et al. | |
| 7,685,538 B2 * | 3/2010 | Fleck et al. | 715/863 |
| 8,488,413 B2 * | 7/2013 | Nishino et al. | 367/127 |
| 2002/0073146 A1 | 6/2002 | Bauer et al. | |
| 2005/0273700 A1 * | 12/2005 | Champion et al. | 715/512 |
| 2006/0028457 A1 | 2/2006 | Burns | |
| 2007/0188477 A1 | 8/2007 | Rehm | |
| 2007/0296643 A1 | 12/2007 | Ben-Shachar et al. | |
| 2009/0189894 A1 | 7/2009 | Petrov et al. | |
| 2009/0210482 A1 | 8/2009 | Wynn et al. | |
| 2010/0138476 A1 | 6/2010 | Gokaraju et al. | |
| 2011/0093822 A1 * | 4/2011 | Sherwani | 715/863 |
| 2011/0157032 A1 * | 6/2011 | Mao et al. | 345/173 |
| 2012/0075204 A1 * | 3/2012 | Murray et al. | 345/173 |
| 2012/0242603 A1 * | 9/2012 | Engelhardt et al. | 345/173 |
| 2012/0268420 A1 * | 10/2012 | Marhefka et al. | 345/174 |

OTHER PUBLICATIONS

"Pogo Sketch", Ten 1 LLC, retrieved from http://tenonedesign.com/sketch.php on Nov. 22, 2010, 4 pages.

(Continued)

*Primary Examiner* — Kent Chang
*Assistant Examiner* — Nelson Rosario
(74) *Attorney, Agent, or Firm* — Brake Hughes Bellermann LLP

(57) ABSTRACT

In one general aspect, a computer-readable storage medium can store instructions that when executed cause a mobile device to perform a process. The instructions can include instructions to establish a portion of a communication link with a host device, and receive, at the mobile device, an instance of at least a portion of a user interface operating at the host device and associated with an application operating at the host device. The instructions can include instructions to receive a first signal at the mobile device from a drawing device, to receive a second signal produced by a touch-sensitive display, and to send, via the portion of the communication link, a third signal representing an interaction of the drawing device with the instance of the user interface on the touch-sensitive display of the mobile device based on the first signal and the second signal.

23 Claims, 9 Drawing Sheets

(56) References Cited

OTHER PUBLICATIONS

"Wacom Classic Digitizer Pressure-Sensitive Pen Stylus, Compatibility Wacom Cintiq, Model: ZP-300E", Directron.com, retrieved from http://www.directron.com/zp300e.html?gsear=1 on Nov. 22, 2010, 3 pages.

"Wacom Pressure Sensitive Pen Tablets", Photoshopsupport.com, retrieved from http://www.photoshopsupport.com/tools/wacom-pen-tablets.html on Nov. 22, 2010, 13 pages.

* cited by examiner

EXTENDING HOST DEVICE FUNCTIONALITY USING A MOBILE DEVICE

TECHNICAL FIELD

The description relates to using a mobile device to remotely control a computing device.

BACKGROUND OF THE INVENTION

Mobile devices such as smart phones, portable digital assistants (PDAs) and tablet computers have become ubiquitous. Smart mobile devices can be configured to send and receive emails, access the World Wide Web using a browser, and/or perform many tasks that formerly required a desktop or laptop computer. Many mobile devices include touch-sensitive displays that can be used by a user to provide various types of input and/or control applications operating on the mobile devices for a variety of tasks. For example, a user can interact with the user interface (UI) components, which are virtually displayed on a touch-sensitive display of a mobile device, through physical interactions (such as gestures) with the touch-sensitive display.

Although touch-sensitive displays of mobile devices can used to perform a variety of functions, these mobile devices often lack the processing capabilities required to execute resource-intensive applications. For example, touch-sensitive displays can be useful for image processing tasks, but mobile devices having such displays may lack the processing capabilities required to run sophisticated image processing applications. While more powerful computers have the resources to run such applications, these types of computers often lack touch-sensitive displays and/or the mobility of a mobile device.

SUMMARY OF THE INVENTION

In one general aspect, a computer-readable storage medium can store instructions that when executed cause a mobile device to perform a process. The instructions can include instructions to establish a portion of a communication link with a host device, and receive, at the mobile device, an instance of at least a portion of a user interface operating at the host device and associated with an application operating at the host device. The instructions can include instructions to receive a first signal at the mobile device from a drawing device, to receive a second signal produced by a touch-sensitive display, and to send, via the portion of the communication link, a third signal representing an interaction of the drawing device with the instance of the user interface on the touch-sensitive display of the mobile device based on the first signal and the second signal.

In another general aspect, a computer-readable storage medium can store instructions that when executed cause a mobile device to perform a process. The instructions can include instructions to establish a portion of a communication link with a mobile device, and send an instance of at least a portion of a first user interface operating at the host device and associated with an application operating at the host device to the mobile device. The instructions can include instructions to receive, via the portion of the communication link, a signal representing an interaction of a drawing device with the mobile device, and send, in response to the signal, an instance of at least a portion of a second user interface operating at the host device and associated with the application.

In yet another general aspect, a computer-readable storage medium can store instructions that when executed cause a mobile device to perform a process. The instructions can include instructions to receive a first signal produced by a touch-sensitive display and representing an interaction of a drawing device at a location within the touch-sensitive display of the mobile device, and receive a second signal produced by the drawing device and representing an interaction of the drawing device with a surface of the touch-sensitive display. The instructions can include instructions to receive, at the mobile device, an instance of at least a portion of a user interface operating at a host device and associated with an application operating at the host device, and define, based on the combination of the first signal and the second signal, at least a portion of an image simulating an interaction of a writing instrument type with the user interface.

The details of one or more implementations are set forth in the accompanying drawings and the description below. Other features will be apparent from the description and drawings, and from the claims.

DETAILED DESCRIPTION

Figure 1:
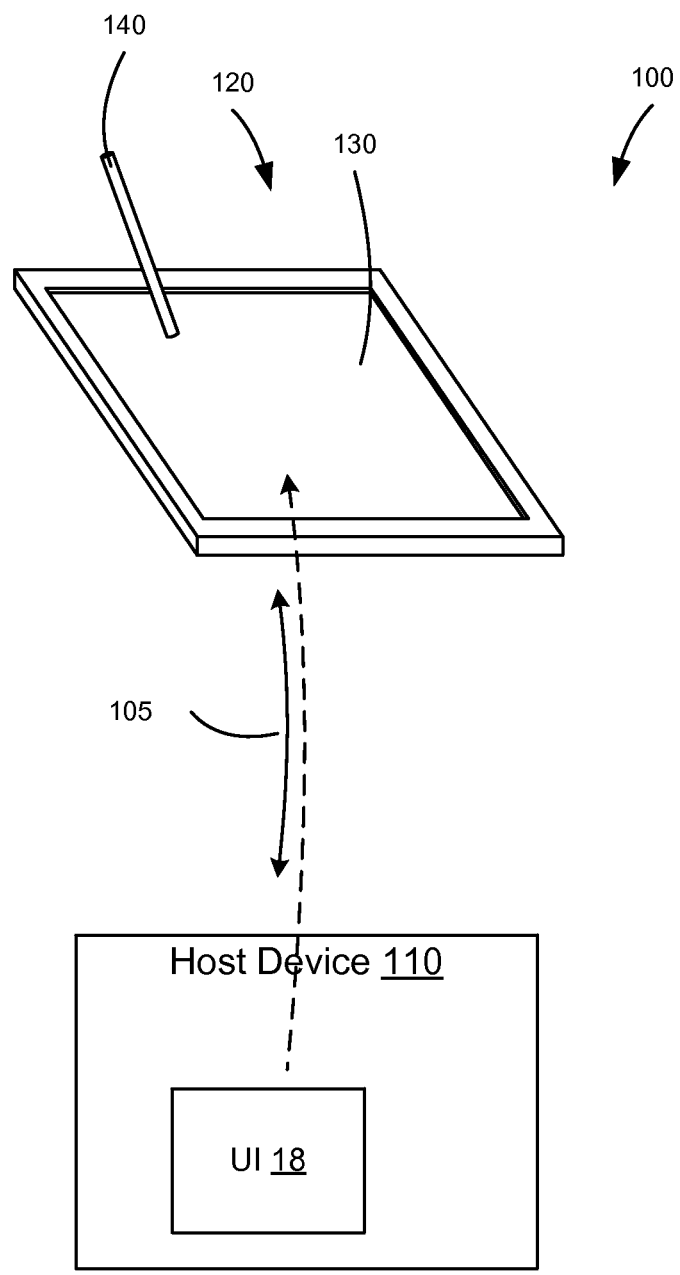
FIG. 1 is a diagram that illustrates a mobile device configured to operate with a host device, according to an embodiment.

FIG. 1 is a diagram that illustrates a mobile device 120 configured to operate with (e.g., communicate with) a host device 110, according to an embodiment. As shown in FIG. 1, the host device 110 and mobile device 120 can be in communication (e.g., can be connected), for example, through a communication link 105.

The host device 110 and mobile device 120 are collectively configured so that the mobile device 120 can be used to access (e.g., control) one or more applications operating at the host device 110. Moreover, the mobile device 120 can function as an extension of (or as a satellite controller) of the host device 110. Accordingly, the mobile device 120 can have functionality that is not available at the host device 110 and can be used in conjunction with the host device 110 to enhance the functionality of the host device 110.

For example, in cases where the host device 110 does not have a touch-sensitive display, and where the host device 110 has processing capabilities not available at the mobile device 120, the host device 110 and mobile device 120 can be collectively configured so that a user can use the touch-sensitive display 130 of the mobile device 120 to control and/or interact with applications operating (e.g., executing) using the processing resources of the host device 110. Accordingly, the mobile device 120 can be used by the user to obtain the benefits of the touch-sensitive display 130 (e.g., touching and/or gesturing capabilities such as dragging, pinching, etc.), which may not be native to (or available at) the host device 110, in combination with the processing power and/or other computational resources available on the host device 110.

As a specific example, a user interface 18 (UI) (e.g., a graphical user interface) can be associated with an application operating at the host device 110. At least a portion of (e.g., an instance of or copy of) the user interface 18 can be sent to (e.g., delegated to) the mobile device 120 and displayed on the touch-sensitive display 130 of the mobile device 120. A copy of a user interface (or portion thereof) sent from the host device 110 for display at the mobile device 120 can be referred to as a delegation of the portion of the user interface (or portion thereof) to the mobile device 120. The mobile device 120 can be used (e.g., used by a user) to interact with the portion of the user interface 18 via the touch-sensitive display 130, which is configured to display the portion of the user interface 18 at the mobile device 120. A signal representing the interaction with the touch-sensitive display 130 (and with the portion of the user interface 18) can be sent to the host device 110 and can be used to trigger one or more operations associated with the application operating at the host device 110. In some embodiments, the signal can include, for example, one or more x-y coordinates and/or corresponding time values that represent an interaction (e.g., a physical interaction) with a portion of the surface of the touch-sensitive display 130. In some embodiments, a signal associated with an interaction via a display such as the touch-sensitive display 130 can be referred to as a display signal.

Thus, the display 130 of the mobile device 120 can function as a virtual window into the user interface 18 operating at the host device 110 and associated with an application also operating at the host device 110. The user interface 18 (or portion thereof) displayed at the display 130 of the mobile device 120 can be referred to as being mirrored, duplicated, or delegated to the mobile device 120 from the host device 110. The virtual window into the user interface 18 provided by the interactions (e.g., communications, delegation) between the mobile device 120 and the host device 110 can be used to, for example, control the application operating at the host device 110.

In some embodiments, the mobile device 120 can be configured to interact with the host device 110 via the communication link 105 to register the touch-sensitive display 130 as an I/O device for the host device 120. Thus, a user can use the touch-sensitive display 130 to interact with the applications (e.g., operating system) operating at the host device 110. For example, an application operating at the host device 110 can send (e.g., output) at least a portion of (e.g., an instance of or copy of) the user interface 18 to the touch-sensitive display 130 so that a user may control at least a portion of the application via the portion of the user interface 18. Thus, an application operating at the host device 110 can be controlled via the touch-sensitive display 130 of the mobile device 120, while maintaining the advantages of the processing resources available at the host device 110. Moreover, processing tasks can also be delegated from the host device 110 to the mobile device 120 and vice-versa when appropriate. For example, graphics processing tasks can be delegated from the host device 110 to the mobile device 120 (in cases where the mobile device 120 has the greater graphics processing resources than the host device 110).

In some embodiments, one or more peripherals associated with (e.g., connected with, in communication with) the mobile device 120 can also be used in conjunction with the host device 110. For example, as shown in FIG. 1, a drawing device 140 can be configured to interact with the mobile device 120. The drawing device 140 can be configured to send, to the mobile device 120 and/or to the host device 110, a signal representing an interaction of the drawing device 140 with the mobile device 120. Similar to the signal representing the interaction with the touch-sensitive display 130, the signal representing the interaction of the drawing device 140 can be sent to the host device 110 and can be used to trigger one or more operations associated with the application operating at the host device 110. In some embodiments, the signal associated with (e.g., produced by) the drawing device 140 can be referred to as a drawing device signal or as a stylus signal. Other peripherals (e.g., mouse device, keyboard device) (not shown) associated with the mobile device 120 can similarly be used in conjunction with the host device 110.

In some embodiments, the drawing device 140 can be a pressure sensitive stylus configured to send a signal representing a level of pressure applied by the drawing device 140 against at least a portion of the mobile device 120. In some embodiments, the pressure sensitive stylus can include one or more capacitive and/or resistive type pressure sensing mechanism, an electromagnetic pressure sensing mechanism, a spring-loaded pressure sensing mechanism, and/or so forth. For example, an application operating at the host device 110 can be a drawing application and a user interface delegated (from the host device 110) to the mobile device 120 can be a drawing interface associated with the application. The drawing device 20 can be used by a user to draw a line with a specified pressure within the delegated user interface (or portion thereof), which can correspond with a line thickness, translucence, shading, consistency, color, and/or so forth.

Signaling associated with the drawing device 140 (or other peripheral device) and signaling associated with the touch-sensitive display 130 can be used in combination to trigger one or more operations at the host device 110. For example, a signal representing an interaction of the drawing device 140 with a location of the touch-sensitive display 130 can be produced by the touch-sensitive display 130 (and/or software and/or hardware thereof) can be sent to the host device 110. Also, a signal representing a level of pressure of the drawing device 140 at the location can be produced by the drawing device 140 (and/or software and/or hardware thereof) and sent to the host device 110. The signal (e.g., a raw electrical signal) produced by the touch-sensitive display 130 and the signal (e.g., a raw electrical signal) produced by the drawing device 140 can both be processed at the host device 110 and can be used to trigger an operation at the host device 110. In some embodiments, the signal (e.g., a raw electrical signal) produced by the touch-sensitive display 130 and the signal (e.g., a raw electrical signal) produced by the drawing device 140 can both be processed at the mobile device 120 before being sent to the host device 110 to trigger an operation at the host device 110. In other words, one or more signals produced by the touch-sensitive display 130 and/or one or more signals produced by the drawing device 140 can be processed at the mobile device 120 to produce another signal (e.g., an instruction) configured to trigger an operation of the host device 110.

Although, signaling associated with interaction of the drawing device 140 with the mobile device 120 can be produced by the drawing device 140 and can be separate from signaling representing interactions with the touch-sensitive display 130, the signaling associated with a drawing device 140 can be synchronized with signaling associated with the touch-sensitive display 130, and/or vice versa. For example, a signal representing an x-y coordinate of a location of an interaction of the drawing device 140 with the touch-sensitive display 130 can be synchronized with a signal representing a level of pressure applied by the drawing device 140 at the location. The synchronized signaling can be processed at the mobile device 120 (before being sent to the host device 110) and/or at the host device 110.

In some embodiments, the signals described herein can be, for example, a digital signal (e.g., a binary digital signal, a binary sequence of bits) and/or an analog signal that represents one or more portions of an interaction. In some embodiments, the signal can be an approximation of the interaction. For example, the signal can be configured to approximate or more portions of the interaction.

In some embodiments, the host device 110 can be, for example, a desktop computing device, a laptop computing device, a tablet computing device, a server, and/or so forth. In some embodiments, the host device 110 can be a projector configured to project an image. In such instances, the user interface 18 can be projected for display (e.g., on a screen) and a portion of the projected user interface 18 can be delegated to the mobile device 120.

In some embodiments, the host device 110 can be configured to execute one or more applications (e.g., installed applications, embedded applications, third-party applications, operating system). In some embodiments, an operating system of the host device 110 can be a graphical operating system such as a variant of MICROSOFT WINDOWS, APPLE OS X, or the GOOGLE CHROME OS. In some embodiments, the application(s) operating at the host device 110 can provide (e.g., can be associated with) a user interface through which a user can interact with the host device 110 via images displayed on a display. The user can trigger, via the user interface, operations of the application(s) on the host device 110 for performing tasks such as web browsing, word processing, and/or image editing. In some embodiments, the application(s) can be configured to support multiple displays and/or display types. For example, the application(s) can include functionality to provide the user interface on multiple displays of differing resolutions. In addition, the application(s) can be configured to support various types of input/output (I/O) devices. The application(s) can also support communications via, for example, a network interface.

The mobile device 120 can be a portable computing device with a touch-sensitive display 130. For example, the mobile device 120 can be a mobile phone, a personal digital assistant (PDA), a tablet computing device, etc. The touch-sensitive display 130 can be an electronic visual display that both displays graphical information and can process input via touches of the device with a finger, hand, or other object (e.g., a drawing device). The touch-sensitive display 130 can use different technologies to detect touch in different embodiments, such as resistance-based technologies and/or capacitance-based technologies. In addition, the touch-sensitive display 130 can support multi-touch functionality that allows the display to process (e.g., detect) various types of gestures. In addition, external peripherals such as keyboards, the drawing device 140, cursor devices (e.g., mouse devices), and/or so forth can be connected to the mobile device 120 via a wired communication link and/or a wireless communication link. Furthermore, the mobile device 120 can include location-determination and/or motion/orientation detection capabilities.

As with the host device 110, the mobile device 120 can be configured to operate one or more applications (e.g., installed applications, embedded applications, third-party applications, operating system). For example, the mobile device can be a table computing device such as an iPAD operating a variant of the APPLE iOS operating system. Likewise, the mobile device can be configured to support communications via a network interface. The computational resources of the mobile device 120 may differ from those of the host device 110. For example, the mobile device 120 can have processing resources with less capabilities than the processing resources of the host device 110. However, in some embodiments, the mobile device 120 can have, for example, graphics processing capabilities that exceed the graphics processing capabilities of the host device 110.

The host device 110 and mobile device 120 can be configured to communicate via the communication link 105 that can be established, at least in part, by the host device 110 and/or the mobile device 120. In some embodiments, the communication link 105 can be based on a wireless networking technology such as BLUETOOTH, WI-FI (IEEE 802.11), an Infrared Data Association (irDA)-based technology, and/or so forth. In some embodiments, the communication link 105 can be a point-to-point link through which the host device 110 and mobile device 120 directly communicate without passing through any intermediate device, or other network topology. The host device 110 and mobile device 120 can exchange data over the communication link 105 using networking protocols such as the transmission control protocol/Internet protocol (TCP/IP) and the hypertext transport protocol (HTTP). The data exchanged over the communication link 105 can be represented using technologies and/or formats including the hypertext markup language (HTML), the extensible markup language (XML), and/or so forth. In addition, the communication link 105 can be based on encrypted communication using encryption technologies such as the secure sockets layer (SSL), secure HTTP, and/or so forth. The communication link 105 can be wired in some embodiments.

In some embodiments, the host device 110 can be configured to support multicast network communications protocols via the communication link 105 between one or more mobile devices (not shown) similar to mobile device 120 and the host device 110. The multicast network protocol can be used for efficient communication between the one or more mobile devices and the host device 110 by allowing the host device 110 to push (e.g., continually push) information to the one or more mobile devices. Multicast network protocols also allow the host device 110 to push, for example, desktop display information to all participating mobile devices 120 simultaneously, with the mobile devices individually identifying and using the information directed to the specific mobile devices.

In some embodiments, multiple mobile devices (similar to mobile device 120) (not shown) can be linked to the host device 110 through the communication link 105. The multiple mobile devices can be used by a single user or by multiple users to interact with one or more portions of an operating system and applications operating (e.g., executing) on the host computer using each device's touch-sensitive display. The multiple users can each interact with the host device 110 from various geographic locations, passing controls back and forth via applications executing on each of the multiple mobile device. Although many of the embodiments described herein are discussed in the context of a touch-sensitive display (e.g., a touch-sensitive display of a mobile device), in some embodiments a non-touch-sensitive display may be used in lieu of a touch-sensitive display.

The mobile device 120 optionally includes one or more detectors, such as one or more pressure detectors and/or one or more motion detectors. A pressure detector can be used to detect force or pressure applied to the mobile device 120. A pressure detector may include a pressure sensor that is configured to detect an applied pressure directly. The pressure detector may be part of the touch-sensitive display 130, or may be provided as a separate or standalone component. For example, a piezoelectric sensor can be used to convert a mechanical strain on the sensor into an electrical signal that serves to measure the pressure applied to the sensor. Capacitive and electromagnetic pressure sensors can include a diaphragm and a pressure cavity, and when the diaphragm moves due to the application of pressure to the diaphragm a change in the capacitance or inductance in a circuit caused by movement of the diaphragm can be used to measure the pressure applied to the sensor.

A pressure detector also may measure an applied pressure indirectly. For example, the touch sensitive device/display can include a capacitively- or resistively-coupled display that is used detect the presence or contact of a pointing device (e.g., a human finger) with the touch-sensitive display 130. The touch-sensitive display 130 may receive input indicating the presence of a pointing device (e.g., a human finger) near, or the contact of a pointing device with, one or more capacitively- or resistively-coupled elements of the touch-sensitive display 130. Information about input to the touch-sensitive display 130 may be routed to a processor, which can process (e.g., recognize) contact with the touch-sensitive display 130 by a relatively small area of a human finger as a light, low-pressure touch of the user's finger and which may process contact with the display by a relatively large area of the user's finger as a heavy, high-pressure touch, because the pad of a human finger spreads out when pressed hard against a surface. Similarly, the touch-sensitive display 130 can be configured to process (e.g., recognize) contact with the display with a human finger over a relatively short time as a light, low-pressure touch of the user's finger and may recognize contact with the touch-sensitive display 130 with a human finger over a relatively long time as a heavy, high-pressure touch of the user's finger, because a user generally contacts the touch-sensitive display 130 for a longer time when pressing hard than when pressing softly. In some embodiments, the processor can execute instructions that allow the mobile device 120 to learn over time what is a relatively light or short contact for a particular user and what is a relatively heavy or long contact for the user. Alternatively, or in addition, the mobile device 120 can allow a user to train the device with regard to particular force-based physical cues.

Figure 2:
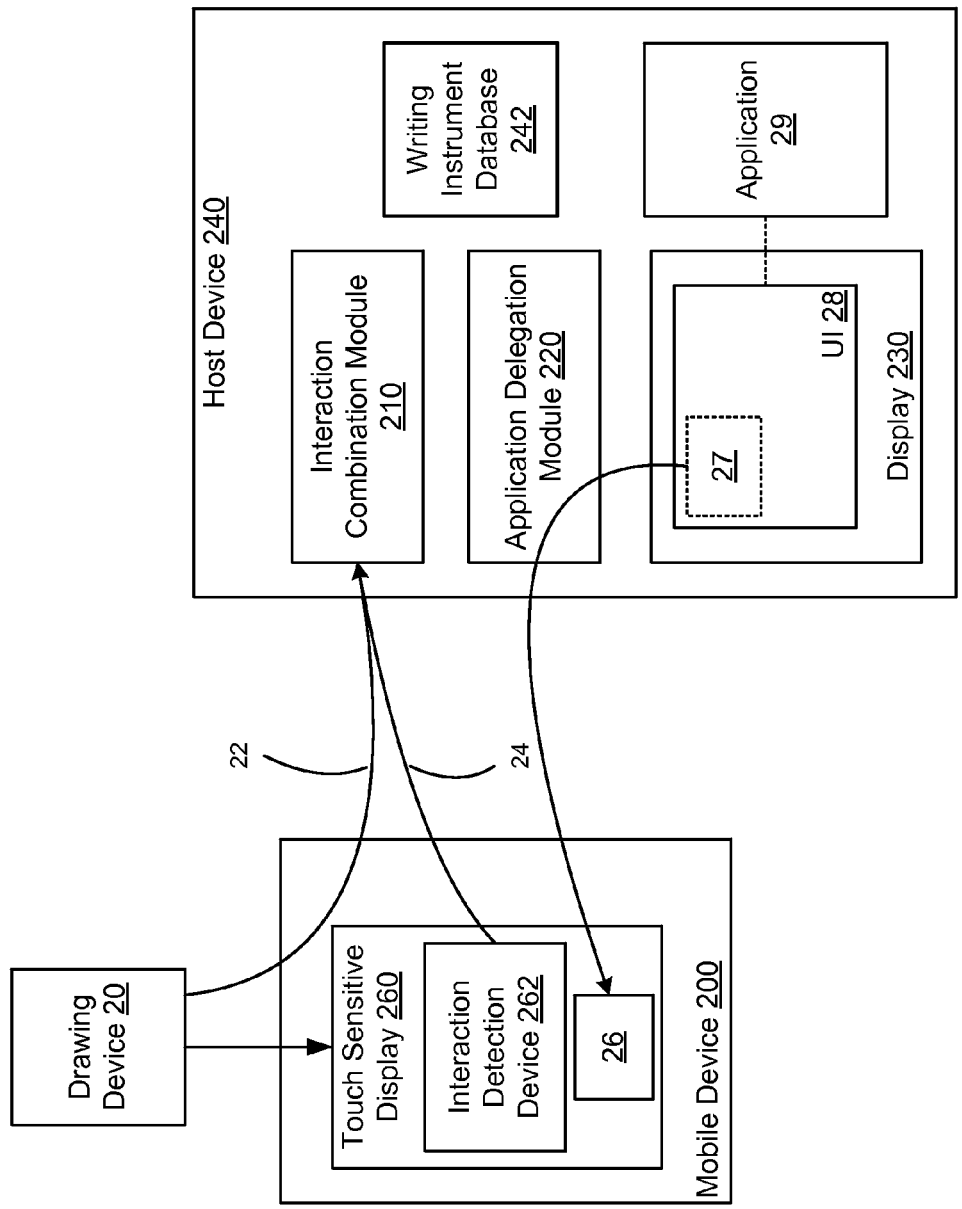
FIG. 2 is another diagram that illustrates a mobile device configured to operate with a host device, according to an embodiment.

FIG. 2 is another diagram that illustrates a mobile device 200 configured to operate with a host device 240, according to an embodiment. As shown in FIG. 2, the mobile device 200 includes a touch-sensitive display 260 and an interaction detection device 262 associated with the touch-sensitive display 260. The interaction detection device 262 can be configured to define one or more signals characterizing (e.g., representing) at least a portion of an interaction with the touch-sensitive display 260 (by a drawing device 20 and/or a finger of a user). The touch-sensitive display 260 and the interaction detection device 262 can be collectively configured so that an interaction of a user with the touch-sensitive display 260 can be converted by the interaction detection device 262 into a signal. In other words, the interaction with the touch-sensitive display 260 can be any type of interaction that can be converted by the interaction detection device 262 into a signal.

As shown in FIG. 2, the host device 240 includes an interaction combination module 210, an application delegation module 220, and a display 230. The application delegation module 220 is configured to send an instance 26 of a portion 27 of a user interface 28 to the mobile device 200 for display on the touch-sensitive display 260. The instance 26 can be a copy of the portion 27 of the user interface 28 configured for display on the touch-sensitive display 260 of mobile device 200. Accordingly, the touch-sensitive display 260 of the mobile device 200 can function as a window into the user interface 28 operating at the host device 240. Because the instance 26 is a copy of the portion 27 of the user interface 28, the instance 26 mirrors the portion 27 of the user interface 28. The host device 240 and the mobile device 200 are collectively configured so that interactions with the instance 26 at the mobile device 200 will be reflected within the user interface 28 operating of the host device 240. The user interface 28 can be associated with (e.g., can be used to control) an application 29 operating at the host device 240. In some embodiments, the instance 26 can be referred to as a delegated portion of the user interface 28.

In some embodiments, the user interface 28 may or may not be simultaneously (e.g., concurrently) displayed on the display 230 while the instance 26 of the user interface 28 is displayed on the touch-sensitive display 26. The instance 26 of the user interface 28 displayed at the touch-sensitive display 260 may mirror (e.g., may replicate/duplicate) the portion 27 of the user interface 28 being displayed at the display 230.

Although not shown, in some embodiments, the instance 26 can be a copy of the entire user interface 28 operating at the host device 240. Although not shown, in some embodiments, the instance 26 can have a resolution (e.g., an aspect ratio, a size) that is different than a resolution of the portion 27 of the user interface 28. For example, the instance 26 can have a 4:3 aspect ratio that is different than a 16:9 aspect ratio of the portion 27 of the user interface 28. More details related to differences between a user interface and a delegated portion of the user interface are discussed below.

The application delegation module 220 can be configured to send (e.g., delegate) the instance 26 from the host device 240 mobile device 200. For example, the application delegation module 220 can be configured to select the portion 27 of the user interface 28 for delegation to the mobile device 200. More details related to the specifics of an application delegation module of a host device and operations thereof are described, for example, in connection with FIG. 7.

As shown in FIG. 2, the drawing device 20 and the interaction detection device 262 are each configured to send (e.g., transmit) one or more signals to the interaction combination module 210 of the host device 240. The signal(s) from the drawing device 20 and the interaction detection device 262 can be sent via one or more network modules (not shown) and/or one or more communications ink (not shown) between the mobile device 200 and the host device 240.

Specifically, the drawing device 20 is configured to send a signal 22 that can represent an interaction of the drawing device 20 with the touch-sensitive display 260 of mobile device 200. The interaction detection device 262 is configured to send a signal 24 that represents an interaction of the drawing device 20 with the touch-sensitive display 260. The interaction of the drawing device 20 with the touch-sensitive display 260 can correspond with the instance 26 displayed on the touch-sensitive display 260. Interactions of the drawing device 20 with the touch-sensitive display 260 that correspond with the instance 26 can be referred to as interactions with the instance 26.

As shown in FIG. 2, the signal 22 from the drawing device 20 and the signal 24 from the interaction detection device 262 are separate signals and can represent different information. For example, the signal 22 from the drawing device 20 can represent a pressure level related to an interaction of the drawing device 20 with the touch-sensitive display 260, and the signal 24 can represent an x-y coordinate of the interaction of the drawing device 20 with the touch-sensitive display 260. Thus, the signal 22 from (e.g., produced by) the drawing device 20 can characterize a different aspect of the interaction of the drawing device 20 with the touch-sensitive display 260 than the signal 24 from (e.g., produced by) the interaction detection device 262. In embodiments where a signal represents a pressure level, the signal can be referred to as a pressure signal.

As shown in FIG. 2, the drawing device 20 is configured to send the signal 22 to the host device 240 via the mobile device 200. In other words, the signal 22 is transmitted from the drawing device 20 to the mobile device 200, and then re-transmitted from the mobile device 200 to the host device 240. Although not shown, in some embodiments, the drawing device 20 can be configured to send the signal 22 directly to the host device 240. In such embodiments, the drawing device 20 can be configured to communicate with host device 240 via a communication link established between the drawing device 20 and the host device 240. Also, in such embodiments, the drawing device 20 can be configured to function as an I/O device of the host device 240.

The interaction combination module 210 can be configured to process the signals 22, 24 to cause the host device 240 to perform one or more operations associated with the application 29. The interaction combination module 210 can be configured to process the signals 22, 24 and determine how the signals 22, 24 may be related to the application 29. When the signals 22, 24 are related to the application 29, the host device 240 can be configured to use the signals 22, 24 to produce one or more instructions that can trigger functionality (e.g., operations) associated with the application 29. Although not shown, in some embodiments, one or more additional instances (different from instance 26) associated with the user interface 28 can be sent to the mobile device 200 for display on the touch-sensitive display 260.

For example, the application 29 can be a drawing application and user interface 28 can be a drawing interface associated with the application 29. The instance 26 of the user interface 28 can be a rendering of (e.g., a copy of) the portion 27 of the user interface 28 with which a user can interact using the mobile device 200. In other words, the instance 26 can be a delegated portion of the user interface 28 from the host device 240 to the mobile device 200. The user can use the drawing device 20 to draw a line with a specified pressure (which corresponds with a line thickness, translucence, shading, consistency, color, and/or so forth) within the instance 26 of the user interface 28. The signal 22 can represent the pressure level of the drawing device 20 against the surface of the touch-sensitive display, and the signal 24 can represent a location within the instance 26 of the user interface 28 contacted by the drawing device 20. The signals 22, 24 (which can be, for example, raw voltage measurements) can be sent to the interaction combination module 210 where they can be collectively processed (e.g., interpreted) and used to produce the line at the location within the user interface 28 (as corresponding within the instance 26 of the user interface 28). As the line is drawn within the user interface 28 updated portions of the user interface 28 can be sent as additional instances (not shown) of the user interface 28 to the mobile device 200 for display at the touch-sensitive display 260. Thus, the mobile device 200 can be used as a satellite device through which the application 29 operating at the host device 240 can be controlled.

Although not shown in FIG. 2, in some embodiments, the functionality of the interaction combination module 210 (or a portion thereof) can operate at the mobile device 200. For example, processing (e.g., interpretation) of one or more signals associated with an application (such as application 29) can be performed by an interaction combination module 210 operating at the mobile device 200. In such embodiments, signaling from the drawing device 20 and/or the interaction detection device 262 may not be sent directly to the host device 240. Instead, the signaling from the drawing device 20 and/or the interaction detection device 262 can be processed (e.g., interpreted) at the mobile device 200 to produce another signal (e.g., a set of instructions) that can be sent to the host device 240 and used to trigger one or more operations of the host device 240. Although not shown in FIG. 2, in some embodiments, the interaction combination module 210 (or portion thereof) can be associated with, or otherwise integrated into, the application delegation module 220.

In some embodiments, the interaction combination module 210 can be associated with (or included in) an application that can be installed at the mobile device 200 and/or the host device 240. In such embodiments, the interaction combination module 210 can be configured to operate at an abstraction layer above an operating system and/or driver system level of the mobile device 200 and/or the host device 240. In some embodiments, the interaction combination module 210 can be configured to be compatible with one or more applications (e.g., drawing programs, word processing programs) that are installed separate from the interaction combination module 210. For example, the interaction combination module 210 can be included in a first application that is installed at the mobile device 200 separate from a second application installed at the mobile device 200. But the first application (which includes the interaction combination module 210) can be configured to interoperate with the second application so that one or more signals produced by the drawing device 20 can be used to trigger operations of the second application (e.g., trigger drawing of lines within the user interface of the second application) even though the second application may not be natively configured to handle signaling produced by the drawing device 20.

As shown in FIG. 2, the computing device 200 includes a writing instrument database 242, which can be stored in a memory (not shown). The writing instrument database 242 includes one or more writing instrument definition files that can be used to define one or more images (e.g., glyphs, lines, characters) associated with the drawing device 20. Each of the writing instrument definition files included in the writing instrument database 242 can include, for example, one or more algorithms, one or more conditions, and/or so forth that can be used to define one or more images associated with (e.g., simulating) a particular writing instrument type (or collection of writing instrument types). For example, a writing instrument definition file associated with a particular writing instrument (e.g., a pencil, a pen, a crayon) can include an algorithm that can be used by the drawing device module 224 to define an image so that writing using the particular writing instrument can be displayed when using the drawing device 20.

In some embodiments, one or more writing instrument definition files stored in the writing instrument database 242 can be used in conjunction with one or more of the signals 22, 24 to produce one or more images. For example, a writing instrument definition file representing a crayon can be selected from the writing instrument database 242 for use with the application 29. If the signal 22 represents a level of pressure produced by the drawing device 20 when contacted against the touch-sensitive display 26 at a location represented by signal 24, the level of pressure can be used to produce a crayon image of a particular thickness that can be represented within (e.g., simulated within) the user interface 28 and replicated in an instance (such as instance 26) of the user interface 28 sent to the mobile device 200 at the location represented by the signal 24.

In some embodiments, a writing instrument definition file can be selected via the user interface 28 for use with application 29. In some embodiments, one or more portions of writing instrument database 242 can be integrated into the application 29.

Although not shown in FIG. 2. in some embodiments, one or more portions of writing instrument database 242 (and/or a function thereof) can be incorporated into (e.g., stored at, accessible within) the mobile device 200. In such embodiments, the writing instrument database 242 optionally may not be included in the host device 240. In other words, a library of writing instrument definition files associated with a writing instrument database can be stored at the mobile device 200. In such embodiments, processing associated with a particular writing instrument type associated with a writing instrument definition file can be accessed at the mobile device 200 and used in conjunction with one or more of the signals 22, 24 to trigger an operation (e.g., an operation associated with the user interface 28) at the host device 240.

Although not shown in FIG. 2, in some embodiments, one or more portions of the writing instrument database 242 can be integrated into the drawing device 20. In such embodiments, the writing instrument database 242 optionally may not be included in the host device 240. In other words, a library of writing instrument definition files associated with a writing instrument database can be stored at the drawing device 20. For example, several writing instrument definition files can be stored in a writing instrument database at the drawing device 20. A writing instrument definition file can be selected from the several writing instrument definition files and used to trigger the drawing device 20 to function as a particular writing instrument type. In such embodiments, processing associated with a particular writing instrument type associated with a writing instrument definition file can be accessed at the drawing device 20 and used in conjunction with one or more of the signals 22, 24 to trigger an operation (e.g., an operation associated with the user interface 28) at the host device 240. In such embodiments, the signal 22 can include information related to processing of a writing instrument definition file at the drawing device 20. More details related to writing instrument definition files stored at a drawing device are described, for example, in connection with FIG. 5.

Although not shown, in some embodiments, the writing instrument database 242, or a portion thereof, can be stored at a location that can be accessed by the drawing device 20, the mobile device 200, and/or the host device 240. In other words, the writing instrument database 242 can be stored in a common database (e.g., a common remote database) that can be accessed by the drawing device 20, the mobile device 200, and/or the host device 240. In such embodiments, writing instrument definition files optionally may not be stored at the drawing device 20, the mobile device 200, and/or the host device 240.

In this embodiment, the interaction detection device 262 is integrated into a portion of the touch-sensitive display 260. In some embodiments, the interaction detection device 262 may not be integrated into a portion of the touch-sensitive display 260. In some embodiments, the interaction detection device 262 can be any type of hardware and/or software that can be used to convert an interaction of the user with the touch-sensitive display 260 into a signal characterizing the interaction. In some embodiments, the defining of a signal based on an interaction with the touch-sensitive display 260 can be referred to as registering the interaction.

Figure 3:
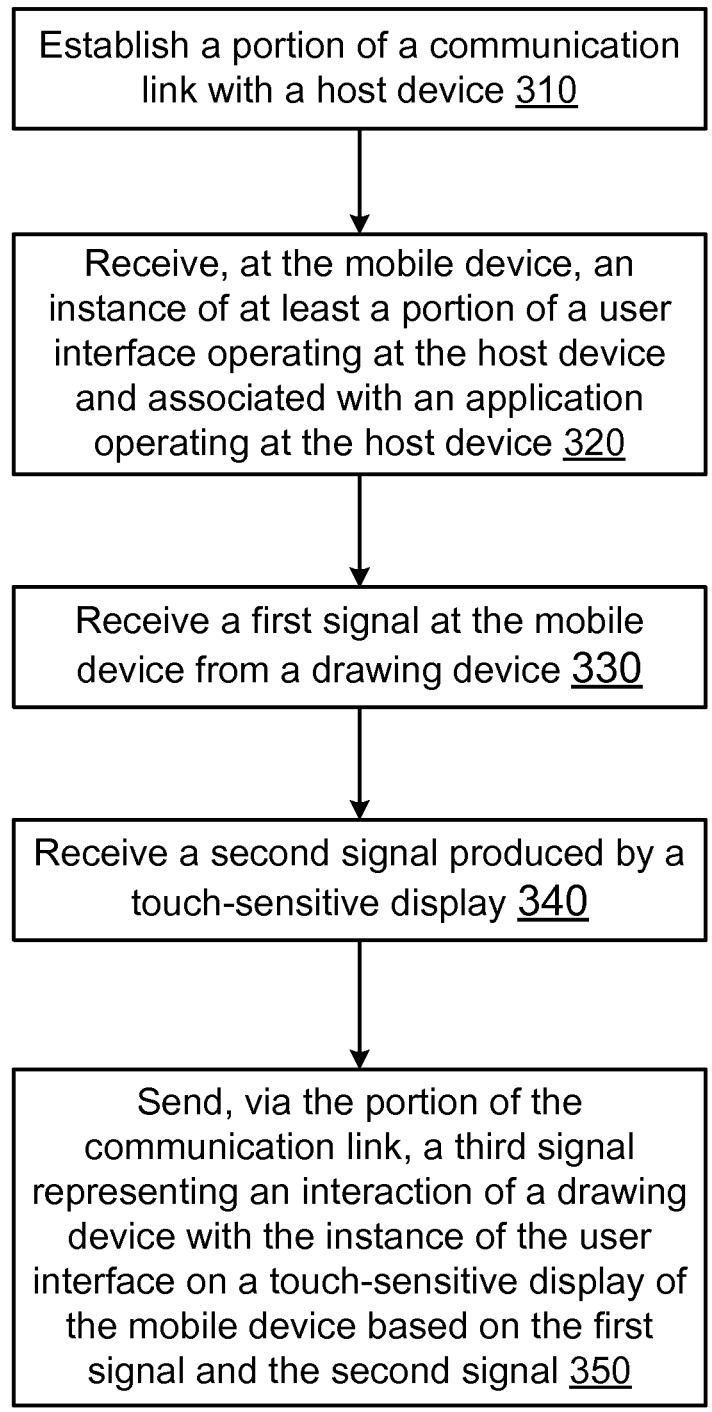
FIG. 3 is a flowchart that illustrates a process for operation of an instance of a user interface at a mobile device.

FIG. 3 is a flowchart that illustrates a process for operation of an instance of a user interface at a mobile device. In some embodiments, the process shown in FIG. 3 can be implemented by the mobile devices and/or the host devices described herein.

As shown in FIG. 3, a portion of a communication link is established with the host device (block 310). In some embodiments, the communication link can be a wireless communication link established between a mobile device and the host device. In some embodiments, the mobile device (or a portion thereof) can function as an extension of the host device.

An instance of at least a portion of a user interface operating at the host device and associated with an application operating at the host device is received at a mobile device (block 320). In some embodiments, the user interface can be associated with an application operating at the host device. In some embodiments, the instance can be a copy of the portion of the user interface operating at the host device. Accordingly, the instance can mirror (e.g., duplicate, replicate), at the mobile device, operation of the portion of the user interface operating at the host device, and interaction with the instance at the mobile device can be used to control at least a portion of the application operating at the host device.

A first signal is received at the mobile device from a drawing device (block 330). A second signal produced by a touch-sensitive display can be received (block 340). In some embodiments, the second signal can represent a location (e.g., a coordinate) of contact of the drawing device with a surface of the touch-sensitive display.

A third signal representing an interaction of a drawing device with the instance of the user interface on the mobile device is sent via the portion of the communication link based on the first signal and the second signal (block 350). In some embodiments, the first signal can represent a pressure level of the drawing device against a surface of the touch-sensitive display of the mobile device, and the first signal can be produced, at least in part, by the drawing device. In some embodiments, the touch-sensitive display of mobile device can function as an input output device of host device. In some embodiments, the third signal (which can be produced by the drawing device), when received at the host device, can trigger one or more operations at the host device associated with the application operating at the host device. Thus, the interaction of the drawing device with the instance of the user interface can be used to control the application associated with the user interface operating at the host device.

Figure 4:
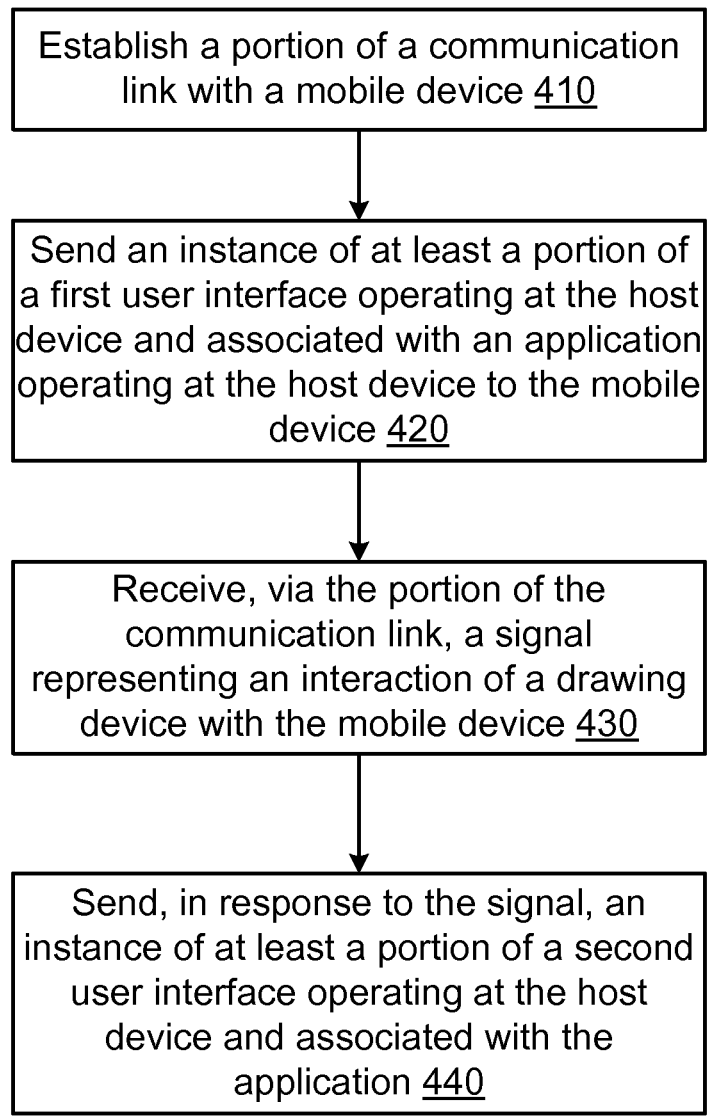
FIG. 4 is a flowchart that illustrates a process for delegation of instances of a user interface from a host device to a mobile device.

FIG. 4 is a flowchart that illustrates a process for delegation of instances of a user interface from a host device to a mobile device. In some embodiments, the process shown in FIG. 4 can be implemented by the mobile devices and/or the host devices described herein.

A portion of a communication link is established with a mobile device (block 410). In some embodiments, the communication link can be a wireless communication link established between a mobile device and the host device. In some embodiments, the mobile device (or a portion thereof) can function as an extension of the host device.

An instance of at least a portion of a first user interface operating at the host device and associated with an application operating at the host device is sent to the mobile device (block 420). In some embodiments, the instance of the first user interface can be a copy of the portion of the first user interface operating at the host device. Accordingly, the instance of the first user interface can mirror the portion of the first user interface operating at host device. In some embodiments, the instance of the portion of the first user interface can be delegated to the mobile device from the host device using an application delegation module such as application delegation module 220 shown in FIG. 2.

A signal representing an interaction of a drawing device with the mobile device is received via the portion of the communication link (block 430). In some embodiments, the signal can represent an interaction of the drawing device with a touch-sensitive display of the mobile device. In such embodiments, the signal can be associated with an output of the touch-sensitive display of the mobile device. In some embodiments, the drawing device can be a pressure sensitive drawing device, and the signal can be defined based on an output of the drawing device.

An instance of at least a portion of a second user interface operating at the host device and associated with the application is sent in response to the signal (block 440). In some embodiments, the second user interface can be an updated version of the first user interface that is modified based on the signal. In some embodiments, the instance of the portion of the second user interface can be delegated to the mobile device from the host device using an application delegation module such as application delegation module 220 shown in FIG. 2.

Figure 5:
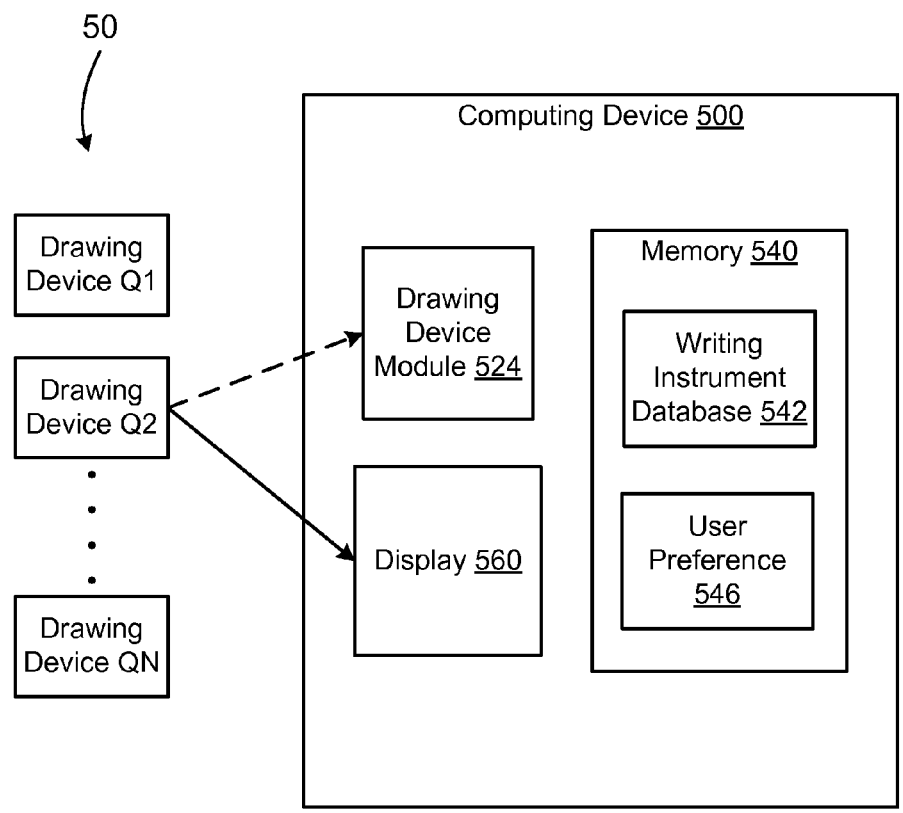
FIG. 5 is a block diagram that illustrates a computing device, according to an embodiment.

FIG. 5 is a block diagram that illustrates a computing device, according to an embodiment. In some embodiments, the computing device 500 can be a mobile device such as the mobile device 120 shown in FIG. 1, or can be a host device such as the host device 110 shown in FIG. 1.

As shown in FIG. 5, the computing device 500 includes a drawing device module 524, a memory 540, and a display 560. In this embodiment, a writing instrument database 542 is stored in the memory 240. The writing instrument database 542 includes one or more writing instrument definition files that can be used to define one or more images (e.g., glyphs, lines, characters) associated with drawing devices 50 (which includes drawing devices Q1 through QN). Each of the writing instrument definition files included in the writing instrument database 542 can include, for example, one or more algorithms, one or more conditions, and/or so forth that can be used to define one or more images associated with (e.g., simulating) a particular writing instrument type (or collection of writing instrument types).

Each of the drawing devices 50 can be configured to function as a particular type of drawing device when interacting with the display 560 of the computing device 500. Specifically, each of the drawing devices 50 is configured to send, for example, an identifier (or instruction) to the drawing device module 524 that can be used by the drawing device module 524 to access a writing instrument definition file from the writing instruction database 542. For example, the drawing device Q2, which can be configured to function as a crayon, can send an identifier (represented by the dashed line) to the drawing device module 524 that can be used by the drawing device module 524 to access a writing instrument definition file for a crayon. Accordingly, interactions of the drawing device Q2 with the display 560 (represented by the solid line) can be used by the drawing device module 524 to produce one or more images on the display 560 based on the writing instrument definition file for the crayon. In some embodiments, if the drawing device Q2 is a pressure-sensitive drawing device configured to produce a signal correlated with a pressure level, the images on the display 560 can be modified (e.g., modified with a thickness, shading, and/or so forth) based on the signal.

Although not shown in FIG. 5, in some embodiments one or more of the drawing devices 50 can be configured to store one or more writing instrument definition files. In such embodiments, the writing instrument database 542 stored in the memory 540 may not be needed. For example, drawing device Q1 can be configured to store a writing instrument definition file associated with a particular type of writing instrument. Accordingly, the drawing device Q1 can be used, in conjunction with the computing device 500, to draw one or more images associated with (e.g., simulating) the particular type of writing instrument.

If the drawing device Q1 is configured to store multiple writing instrument definition files associated with multiple types of writing instruments, the drawing device Q1 can be configured to draw, in conjunction with the computing device 500, images associated with the multiple types of writing instruments (which can be selectively used). The writing instrument definition files can be selected so that the drawing device Q1 can function as a particular writing instrument type. For example, a writing instrument definition file can be selected (e.g., selected using a physical button or software interface) at the drawing device Q1 from a set of writing instrument definition files stored at the drawing device Q1 so that the drawing device Q1 can simulate a particular writing instrument type associated with the selected writing instrument definition file.

In some embodiments, the drawing device module 524 can function as an interface (e.g., an application programming interface) through which the drawing devices 50 may communicate with the computing device 500. In such embodiments, the drawing devices 50 can pass one or more parameter values that can be used by the computing device 500 produce one or more images associated with the particular type of drawing device. For example, drawing device Q1 can be configured to store a writing instrument definition file associated with a particular type of writing instrument. The drawing device Q1, in response to one or more interactions with the display 560 of the computing device 500, can produce parameter values that can be interpreted by the drawing device module 524 to produce one or more images associated with the particular type of writing instrument. In some embodiments, one or more of the parameter values can be defined (and exchanged) based on an application program interface (API), or other type of interface, between the computing device 500 and the drawing devices 50.

In embodiments where the computing 500 is a host device, an identifier of a drawing device (such as drawing device Q2) can be passed to the host device via a mobile device associated with the drawing device. For example, a drawing device can be used to interact with an instance of a user interface delegated from a host device (and operating at the host device) to a mobile device. An identifier of a writing instrument type represented by the drawing device can be sent via the mobile device to the host device so that processing based on the writing instrument type (in response to interactions of the drawing device at the mobile device) can be performed with respect to the user interface operating at the host device.

The memory 540 can be any type of memory device such as a random-access memory (RAM) component or a disk drive memory. As shown in FIG. 5, the memory 540 is a local memory included in the computing device 500. Although not shown, in some embodiments, the memory 540 can be implemented as more than one memory component (e.g., more than one RAM component or disk drive memory) within the computing device 500. In some embodiments, the memory 540 can be, or can include, a non-local memory (e.g., a memory not physically included within the computing device 500) within a network (not shown). For example, the memory 540 can be, or can include, a memory shared by multiple computing devices (not shown) within a network. In some embodiments, the memory 540 can be associated with a host device (not shown) on a host device side of a network and can be configured to serve several mobile devices on the mobile device side of the network.

As shown in FIG. 2, the memory 540 is configured to store a user preference 546. The user preference 546 (also can be referred to as a user preference file) can include a preference of a user related to a writing instrument type. Similarly, the drawing device module 524 can be configured to retrieve a writing instrument definition file from the writing instrument database 544 based on a writing instrument type referenced (as a preferred writing instrument type) in the user preference 546. In some embodiments, the user preference 546 can include a default setting. For example, the default setting can indicate a particular writing instrument definition file (representing a writing instrument type) to be used by the drawing device module 524.

Figure 6:
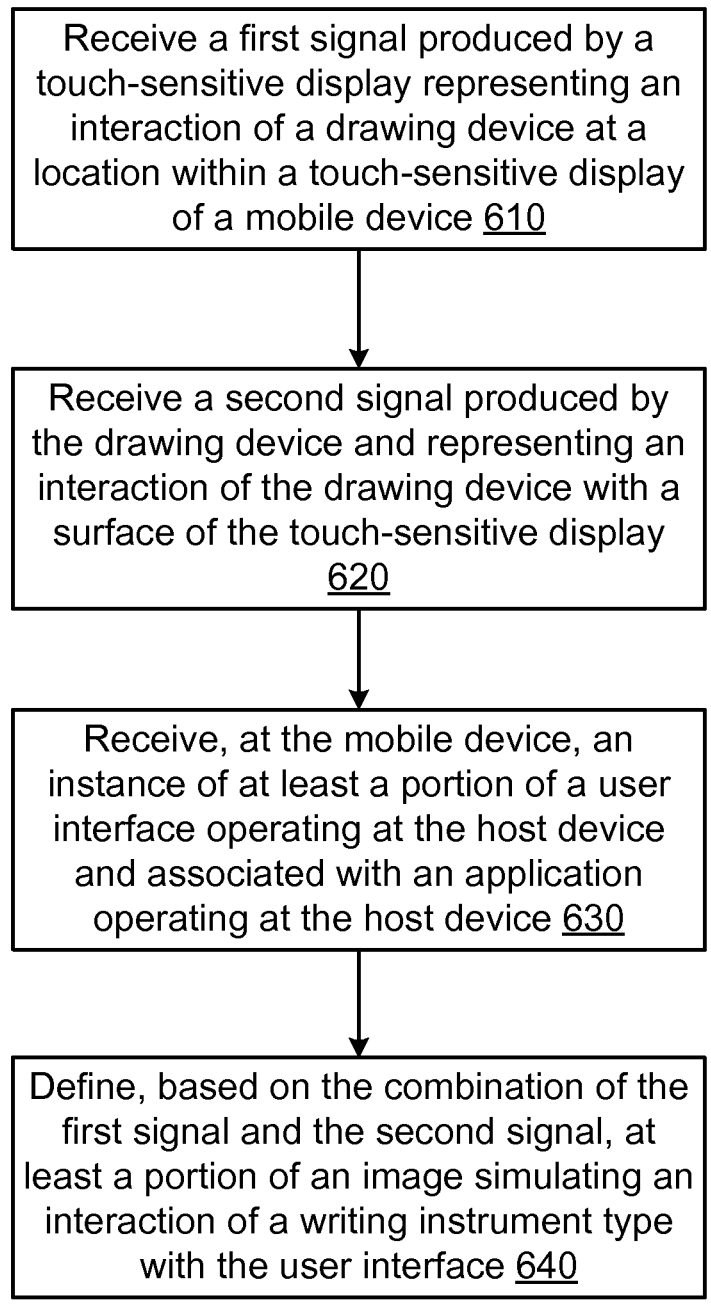
FIG. 6 is a flowchart that illustrates a process for delegation of instances of a user interface from a host device to a mobile device associated with a drawing device.

FIG. 6 is a flowchart that illustrates a process for delegation of instances of a user interface from a host device to a mobile device associated with a drawing device. In some embodiments, the process shown in FIG. 6 can be implemented by the mobile devices and/or the host devices described herein.

A first signal produced by a touch-sensitive display and representing an interaction of a drawing device at a location within a touch-sensitive display of a mobile device is received (block 610). In some embodiments, the first signal can be produced by an interaction detection device associated with the touch-sensitive display of mobile device.

A second signal produced by the drawing device and representing an interaction of the drawing device with a surface of the touch-sensitive display is received (block 620). In some embodiments, the second signal can be produced by the drawing device. In some embodiments, the second signal can represent a level of pressure applied by the drawing device against the surface of the touch-sensitive display.

An instance of at least a portion of a user interface operating at the host device and associated with an application operating at the host device is received at the mobile device (block 630). In some embodiments, the instance of the portion of the user interface can be a copy of the portion of the first user interface operating at the host device. Accordingly, the instance of the portion of the user interface can mirror the portion of the first user interface operating at host device. In some embodiments, the instance of the portion of the user interface can be delegated to the mobile device from the host device using an application delegation module such as application delegation module 220 shown in FIG. 2.

At least a portion of an image simulating an interaction of a writing instrument type with the user interface is defined based on the combination of the first signal and the second signal (block 640). In some embodiments, the writing instrument type can be, for example, a pencil, crayon, a paintbrush, and/or so forth. In some embodiments, the image simulating the interaction of the writing instrument type can be defined based on a writing instrument definition file retrieved (e.g., retrieved by a drawing device module such as drawing device module 524 shown in FIG. 5) from a writing instrument database (e.g. writing instrument database 542 shown in FIG. 5). The first signal and the second signal can be processed (e.g., processed by an interaction combination module such as interaction combination module 210 shown in FIG. 2) in conjunction with the writing instrument definition file to produce the image simulating the interaction of writing instrument type of user interface.

Figure 7:
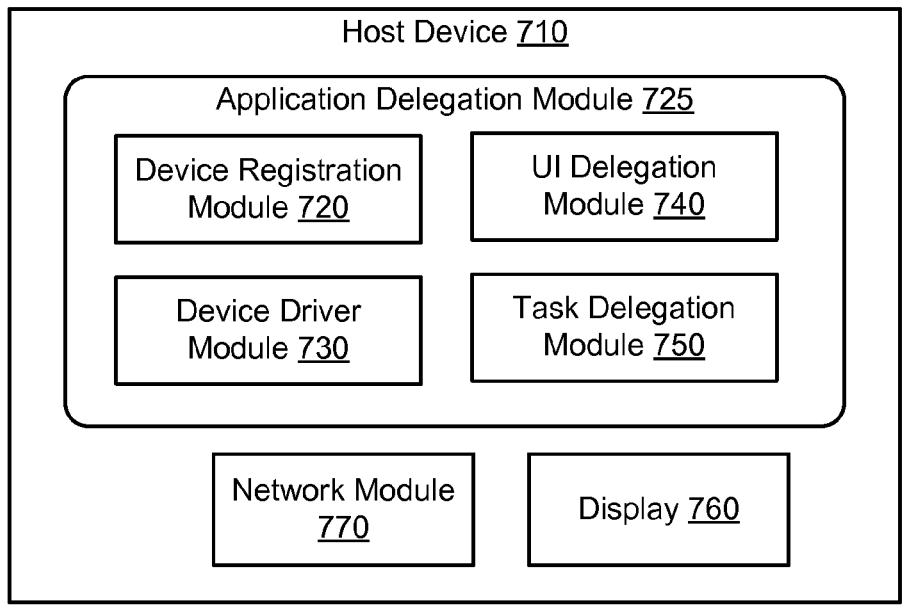
FIG. 7 is a block diagram illustrating modules within a host device according to an embodiment.

FIG. 7 is a block diagram illustrating modules within a host device 710, according to an embodiment. As shown in FIG. 7, the host device 710 includes a network module 770, a device registration module 720, a device driver module 730, a user interface delegation module 740, and a task delegation module 750. The device registration module 720, the device driver module 730, the user interface delegation module 740, and the task delegation module 750 can be included in an application delegation module 725. The network module 770 can be configured to establish at least a portion of a communication link (e.g., communication link 105 shown in FIG. 1) with a mobile device (e.g., mobile device 120 shown in FIG. 1).

The device registration module 720 can be configured to register a touch-sensitive display of a mobile device as an I/O device for the host device 710. In some embodiments, the device registration module 720 can be configured to receive information from the mobile device describing (e.g., characterizing) the touch-sensitive display and/or other device capabilities. For example, the information can describe the resolution and color depth of the touch-sensitive display, and/or describe the input capabilities of the display. The device registration module 720 can be configured to use this information to configure the host device 710 to establish the display aspect of the touch-sensitive display as an output device for the host device 710, and/or to establish the touch-sensitive capabilities of the touch-sensitive display as an input device for the host device 710.

For example, some applications (e.g., operating system) of the host device 710 can include functionality supporting locally-connected touch-sensitive displays. The device registration module 720 can be configured to use the functionality of the host device 710 to establish a touch-sensitive display of a mobile device as an I/O device for the host device 710, even though the mobile device is not locally connected.

In some embodiments, the device registration module 720 can be configured to register one or more peripherals (e.g., a drawing device, a mouse device, a keyboard device) connected to the mobile device as an I/O device for the host device 710. For example, the device registration module 720 can be configured to register an external keyboard, a drawing device, and/or so forth, linked to the mobile device as a peripheral of the host device 710.

As a specific example, the device registration module 720 can be configured to register a drawing device associated with a mobile device as an I/O device for the host device 710. In such embodiments, the device registration module 720 can be configured to receive information from the mobile device (and/or the drawing device) describing (e.g., characterizing) the drawing device and other device capabilities (e.g., associated writing instrument definition files). Specifically, some applications (e.g., operating system) of the host device 710 can include functionality supporting locally-connected drawing device. The device registration module 720 can be configured to use the functionality of the host device 710 to establish a drawing device of a mobile device as an I/O device for the host device 710, even though the mobile device (and/or drawing device) is not locally connected.

In some embodiments, the device registration module 720 can be configured to register the resolution of a touch-sensitive display of a mobile device based on an orientation (e.g., an indicator of an orientation) sent from (e.g., reported by) the mobile device. For example, the device registration module 720 can be configured to receive information from a mobile device indicating the orientation of the mobile device (which can result in a change in resolution of the display, aspect ratio, and/or so forth of the display of the mobile device). The device registration module 720 can be configured to define (e.g., set) the horizontal resolution and/or vertical resolution of a display of the mobile device registered with the host device 710 based on the orientation of the mobile device. Additionally, the device registration module 720 can be configured to change the registered resolution of the display of the mobile device in response to the mobile device sending an indicator that the orientation of the mobile device has changed.

The device registration module 720 can also be configured to store registration information associated with one or more mobile devices that have connected (e.g., previously connected) to the host device 710. For example, the device registration module 720 can be configured to store an orientation (e.g., a previous orientation) of a mobile device and/or one or more user interfaces (or portions thereof) which were extended to the mobile device in a particular orientation. As discussed below, the host device 710 can be configured to use the stored device registration information to automatically send display information associated with a user interface (e.g., a mirrored user interface, a particular application window) to a connected mobile device.

The device driver module 730 can be configured to function as an interface between the host device 710 and the I/O devices registered by the device registration module 720 (e.g., touch-sensitive display(s) of one or more mobile devices, drawing devices). In some embodiments, the device driver module 730 can function as an abstraction layer that enables a touch-sensitive display (or other peripheral such as a drawing device) of a mobile device to function as a locally connected to the host device 710, even though the touch-sensitive display of the mobile device is in not local (e.g., is remote, is connected via a communication link). To this end, the driver module 730 can be configured to receive data to be sent from the host device 710 (e.g., from an operating system and/or application operating at the host device 710) to a registered touch-sensitive display of a mobile device and can be configured to convert the data into a format compatible with the mobile device and/or the communication link.

Similarly, the driver module 730 can be configured to receive via a communication link data output by a mobile device (e.g., data representing user interactions with a user interface on a touch-sensitive display of the mobile device and/or with other peripherals (e.g., drawing device) associated with the mobile device) and/or can be configured to submit the data to the host device 710 (e.g., to an operating system or other application) in a format that the host device 710 can process. The host device 710 can be configured to execute instructions based on a user's interactions, such as activating a particular capability of an application. In some embodiments, the driver module 730 can be configured to receive multi-touch controls and/or gesture controls from a mobile device and can be configured to convert the controls to a format compatible with the host device 710 (e.g., with the operating system of the host device 710).

In some embodiments, the device registration module 720 and/or device driver module 730 can be configured to register a touch-sensitive display of a mobile device at a display primitives level of the host device 710 (e.g., of an operating system of the host device 710). In other words, the device registration module 720 and device driver module 730 can be configured to collectively register a touch-sensitive display of a mobile device at a display primitives level of the host device 710 (e.g., of an operating system of the host device 710). In such embodiments, the host device 710 can be configured to communicate directly with a mobile device in using a protocol (e.g., a language) of an operating system of the host device 710. This technique can enable (e.g., permit) a mobile device to perform drawing acceleration and other functions using the processing capabilities of the mobile device. Moreover, this technique can be used for user input as well (from a mobile device). In some embodiments, using the display primitives level of the host device 710 can enable decreased latency for communications between a mobile device and the host device 710.

The user interface delegation module 740 can be configured to control how one or more user interfaces associated with (e.g., operating at) the host device 710 are delegated to a touch-sensitive display of a mobile device. In some embodiments, the user interface delegation module 740 can be configured to control a manner in which a mobile device is used to interact with the host device 710. In some embodiments, the user interface delegation module 740 can also be configured to send information to a mobile device characterizing the user interface to present on (e.g., delegate to) a touch-sensitive display of the mobile device.

In some embodiments, the user interface delegation module 740 can be configured to send a list of one or more active applications and/or application windows to a mobile device. A touch-sensitive display of a mobile device can be used (e.g., used by a user) to select the application(s) and/or window(s) to control (e.g., to be distributed to) the mobile device. In addition, the user interface delegation module 740 can be configured to receive user selections and/or move (e.g., resize) one or more user interfaces of the selected application for display at the touch-sensitive display of the mobile device. In some embodiments, the user interface delegation module 740 can be configured to automatically generate a user interface for the one or more connected mobile devices based on a preset user preferences and/or based on a prior communications history (e.g., history stored by the device registration module 720) between the host device 710 and one or more mobile devices.

In some embodiments, the user interface delegation module 740 can be configured to support a variety of delegation modes. In some embodiments, the host device 710 (and mobile device) can be configured to change between delegation modes. In one such delegation mode (which can be referred to as a subset delegation mode), the user interface delegation module 740 can be configured to extend the user interface from a display 760 (which may not be a touch-sensitive display) of the host device 710 onto a touch-sensitive display of a mobile device. Thus, the touch-sensitive display of the mobile device can function as an additional display area for the host device 710. In such an embodiment, the user interface delegation module 740 can be configured to direct certain aspects of the user interface of the host device 710 to the display area of the touch-sensitive display of the mobile device. For example, the user interface delegation module 740 can be configured to fit a portion (e.g., an instance of a portion) of a user interface for an application operating (e.g., executing) at the host device 710 within the display area corresponding to a touch-sensitive display of a mobile device so that the touch-sensitive display of the mobile device can be used (e.g., used by a user) to interact with the application.

In some embodiments, the user interface delegation module 740 can be configured to direct certain aspects of a user interface of the host device 710 that is not simultaneously displayed at the host device 710 to a display area of a touch-sensitive display of a mobile device. For example, the user interface delegation module 740 can be configured to trigger display of a first user interface at the display 760 of the host device 710, and trigger display of a second user interface (mutually exclusive from the first user interface) at a display of a mobile device. The first user interface and the second user interface can be associated with a single application or different applications operating at the host device 710. In some embodiments, this delegation mode can be referred to as a dual-display delegation mode.

In another delegation mode (which can be referred to as a replicated or duplicated delegation mode), the user interface delegation module 740 can be configured to replicate (e.g., replicate an instance of, mirror an instance of) the user interface of the host device 710 at a touch-sensitive display of a mobile device. Thus, the user interface delegation module 740 can cause the touch-sensitive display of the mobile device to replicate the user interface that the host device 710 displays on its local display (i.e., display 760). The touch-sensitive display of the mobile device can be used to interact with the entire user interface of the host device 710. In some embodiments of the replicated delegation mode where the native resolutions of the display 760 of the host device 710 and a touch-sensitive display of a mobile device are different, the user interface delegation module 740 can be configured to generate a replicated version (e.g., an instance) the user interface scaled to fit on the touch-sensitive display of the mobile device. In such embodiments, the touch-sensitive display of the mobile device can be used by a user to zoom into a portion of the user interface, so that the user interface can be viewed on the mobile device at the same or greater resolution as displayed on the display 760 of the host device 710.

In an additional delegation mode (which can be referred to as a customized delegation mode), the user interface delegation module 740 can be configured to generate (e.g., produce) a customized user interface adapted to a touch-sensitive display of a mobile device and can be configured to delegate it to the touch-sensitive display. In some embodiments, the customized user interface can replace the native user interface of the host device 710 and serve as a remote desktop. With a customized user interface, the mobile device can be used to control the host device 710 using a user interface specific to (e.g., adapted to) the touch-sensitive display.

In another delegation mode (which can be referred to as an orientation delegation mode), the user interface delegation module 740 can be configured to generate a customized user interface responsive to the orientation of a touch-sensitive display of a mobile device. For example, the user interface delegation module 740 can be configured to receive information from the device registration module 720 indicating a change in an orientation of a mobile device. The user interface delegation module 740 can be configured to automatically adjust a portion (e.g., a mirrored portion) of a user interface (for sending to the mobile device) responsive to the updated device resolution information. Similarly, in one delegation mode (which can be referred to as a zoomed delegation mode), the user interface delegation module 740 can be configured to generate a customized user interface responsive to the zoom level of a user interface (e.g., an instance of at least a portion of a user interface operating at the host device 710) displayed on a touch-sensitive display of a mobile device.

In another delegation mode (which can be referred to as a multi-delegation mode) the user interface delegation module 740 can be configured to send a delegated (e.g., a mirrored) portion (e.g., instance) of a user interface to multiple mobile devices. In some embodiments, the delegated portions can be different. For example, when operating with multiple mobile devices, the user interface delegation module 740 can be configured to determine the zoom level of each touch-sensitive display of the multiple mobile devices and generates a user interface for each of the mobile devices at the varying zoom levels. As a specific example, the user interface delegation module 740 can be configured to generate a user interface for close-in interaction such as detailed graphics work for one mobile device and another user interface for a zoomed out view of the same screen area for another mobile device.

In yet another delegation mode, the user interface delegation module 740 can be configured to generate a user interface based on positional information received from a mobile device. One or more sensors (e.g., motion sensors) included in the mobile device can be configured to generate information characterizing (e.g., representing) the position/orientation of the mobile device, and the user interface delegation module 740 can be configured to use this information to update the user interface. For example, when a mobile device is moved, the user interface delegation module 740 can be configured to move (e.g., shift) portions (e.g., mirrored portions, delegated portions) of the user interface triggered for display on the touch-sensitive screen (corresponding to the movement of the mobile device). Accordingly, the mobile device can be used by a user to pan through the user interface operating at the host device 710 by moving the mobile device. Similarly, when operating with multiple mobile devices, the user interface delegation module 740 can be configured to define portions of the user interface shown on the touch-sensitive displays of the mobile devices based on respective positions and/or orientations of the mobile devices, and redefine (e.g., update) the user interface portions should one device change position relative to another.

The task delegation module 750 can be configured to delegate processing tasks between the host device 710 and one or more mobile devices. In some embodiments, the task delegation module 750 can be configured to maintain information describing the processing capabilities of the host device 710 and one or more mobile device. The task delegation module 750 can be configured to monitor one or more tasks requested to be performed on the host device 710 and/or mobile device(s) by, e.g., monitoring communication passing through the device driver module 730, and/or causing the task(s) to execute on the machine having the processing capabilities to which it is best suited. For example, if a mobile device is optimized to perform an image processing task, the touch-sensitive display of the mobile device can be used to request the task. The task delegation module 750 can be configured to delegate the task to the mobile device by sending information to the mobile device describing the task and/or instructions to execute the task. The task delegation module 750 can also be configured to receive information from a mobile device describing (or including instructions related to) a task delegated to the host device 710 by the mobile device. In such embodiments, the task delegation module 750 can be configured to interact with components of the host device 710, such as the operating system and/or applications, to perform the requested task and output the results of the task to the mobile device.

Further, in some embodiments, the user interface delegation module 740 can be configured to delegate a customized user interface to a touch-sensitive display of a mobile device. The task delegation module 750 can be configured to receive a user interaction (or an indicator thereof) with the user interface and can be configured to delegate a task to the host device 710 based on the interaction. For example, if the user is using the customized user interface to control an image processing application executing at the host device 710 and uses the user interface to request a specific type of image processing, the task delegation module 750 can be configured to interact with the application on the host device 710 to perform the requested processing.

Figure 8:
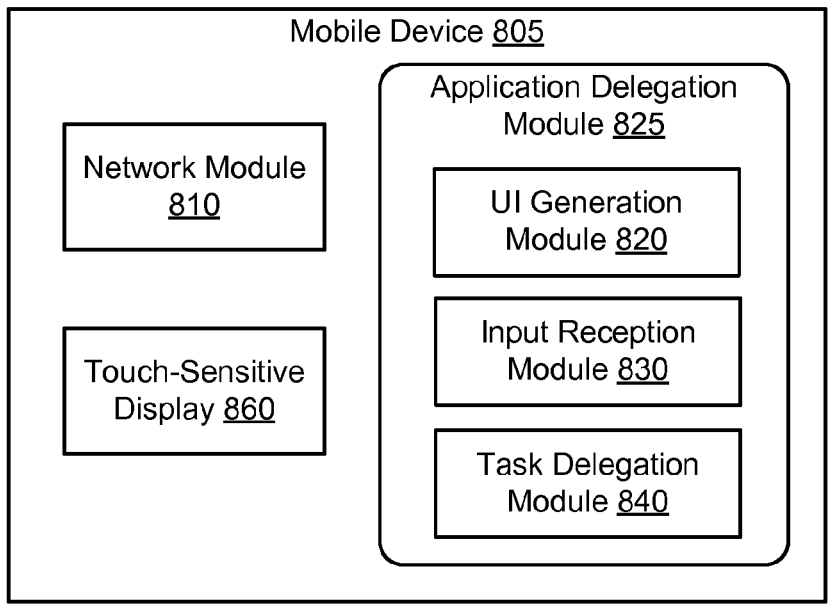
FIG. 8 is a block diagram illustrating modules within a mobile device, according to an embodiment.

FIG. 8 is a block diagram illustrating modules within a mobile device 805 according to one embodiment. As shown in FIG. 8, the mobile device 805 includes a network module 810, a user interface generation module 820, an input reception module 830 and a task delegation module 840. In some embodiments, the user interface generation module 820, the input reception module 830, and the task delegation module 840 can be included in an application delegation module 825. The network module 810 can be configured to establish at least a portion of a communication link with a host device. In some embodiments, the network module 810 in the mobile device 805 can be a counterpart of a network module of a host device and can have complementary functionality. The network module 810 can be configured to perform tasks such as providing information about characteristics of the mobile device 805 to a host device, receiving information describing a user interface to present on (e.g., delegate to) a touch-sensitive display 860, and/or providing information describing user input made via the touch-sensitive display 860 to a host device.

The user interface generation module 820 can be configured to generate a user interface for the touch-sensitive display 860. In some embodiments, the user interface generation module 820 can be configured to receive information from the user interface delegation module 840 of the host device describing the user interface to present, and generate a corresponding user interface on the touch-sensitive display 860. As discussed above, depending upon the delegation mode, the touch-sensitive display 860 can function as an extension and/or mirror functionality of a host device via a delegated portion of a user interface which can be customized.

The input reception module 830 can be configured to receive user input from the touch-sensitive display 860 and/or can be configured to provide the input to the host device. The user interface displayed on the touch-sensitive display 860 can be controlled by a user through, for example, touches (e.g., multi-touches) and/or gestures (such as pinching, dragging, and so forth). For example, the touch-sensitive display 860 can be used by a user using multi-touch and/or gesture controls. The input reception module 830 can be configured to generate information (e.g., indicators) describing (e.g., characterizing) the user interactions and/or can be configured to send the information to a host device via the network module 810. For example, if the user touches a particular menu option presented by a user interface (which can be delegated from a host device), the input reception module 830 can be configured to communicate the selection of the user of that option to the host device via the network module 810. In some embodiments, the input reception module 830 can be configured to receive a user input from one or more peripheral devices (e.g., drawing devices) associated with the mobile device 805. For example, a keyboard, a mouse, a drawing device, and/or so forth can be used by a user with the mobile device 805. In such an embodiment, the input reception module 830 can be configured to receive a user input from an application (e.g., an operating system) of the mobile device 805 and can be configured to provide the input to a host device.

In some embodiments, the touch-sensitive display 860 of the mobile device 805 can be configured to communicate with a host device at a display primitives level of the host device (e.g., at a display primitives level associated with an operating system of the host device), and the user interface generation module 820 and/or input reception module 830 can be configured to communicate directly with the display primitives level of the host device. Thus, the user interface generation module 820 at a display primitives level perform drawing acceleration, user input, and other functions using the mobile device's native processing capabilities. In such embodiments, a portion of the host device (e.g., operating system of the host device) can be, in essence, operating on the mobile device 805 and can be communicating with the host device. In some embodiments, the communications can be performed using remote procedure calls (RPCs) and/or other techniques.

The task delegation module 840 can be configured to delegate processing tasks between a host device and mobile device 805 in cooperation with a task delegation module of the host device. In some embodiments, the task delegation module 840 can be configured to receive information from a host device describing a task delegated to the mobile device 805. The task delegation module 840 can be configured to interact with other components of the mobile device 805, such as its operating system and/or applications executing on the mobile device 805 to perform the requested task and provide output resulting from the task to the host device. Although not shown in FIG. 7 or 8 an interaction combination module (such as interaction combination module 210 shown in FIG. 2) can be included in the mobile device 805 shown in FIG. 8

Figure 9:
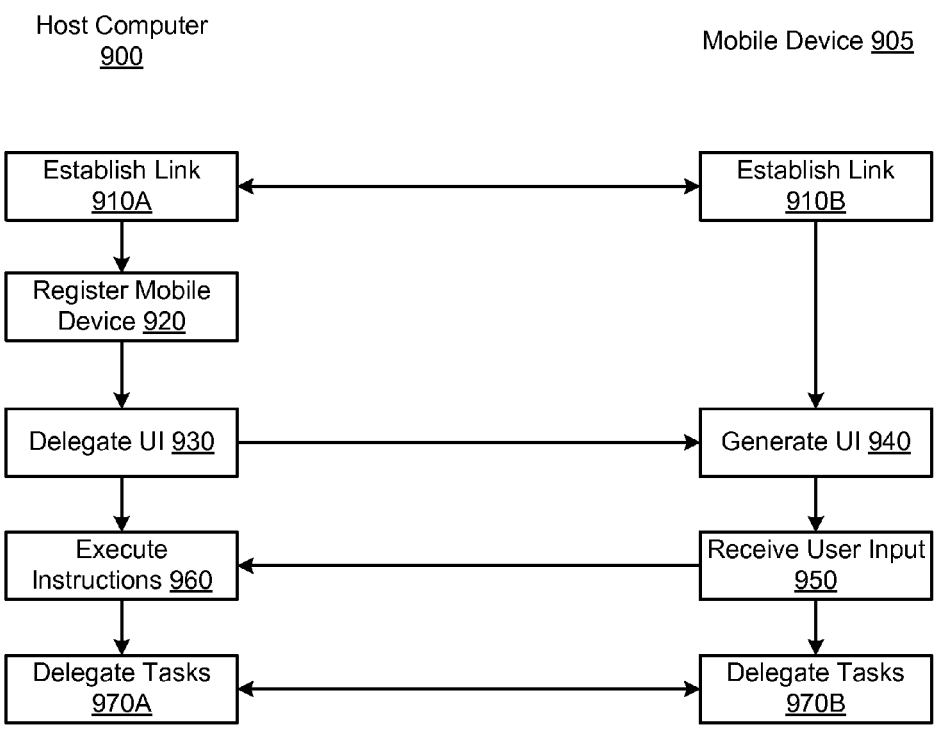
FIG. 9 is a transaction diagram illustrating use of a touch-sensitive display of a mobile device interacting with a host device.

FIG. 9 is a transaction diagram illustrating use of a touch-sensitive display of a mobile device 905 interacting with a host device 900. The host device 900 and mobile device 905 can be configured to establish 910 a communication link. The touch-sensitive display of the mobile device 905 can be registered 920 as an I/O device for the host device 900. The host device 900 can be configured to delegate the user interface 930 (or a portion thereof) to the mobile device 120. The mobile device 120 can be configured to receive the delegated user interface and generate 940 a corresponding user interface (e.g., an instance of the portion of the user interface) on its touch-sensitive display. A user can interact with the user interface on the touch-sensitive display of the mobile device 905. Upon receiving 950 user input, the mobile device 905 can be configured to send information describing the interaction to the host device 900. Depending upon the interaction, the host device 900 can be configured to execute 960 one or more instructions based on the user input, such as by providing the input to an application operating (e.g., executing) on the host device 900. In some embodiments, the host device 900 and mobile device 905 can be configured to delegate 970 certain tasks to each other depending upon considerations such as available processing resources.

Figure 10:
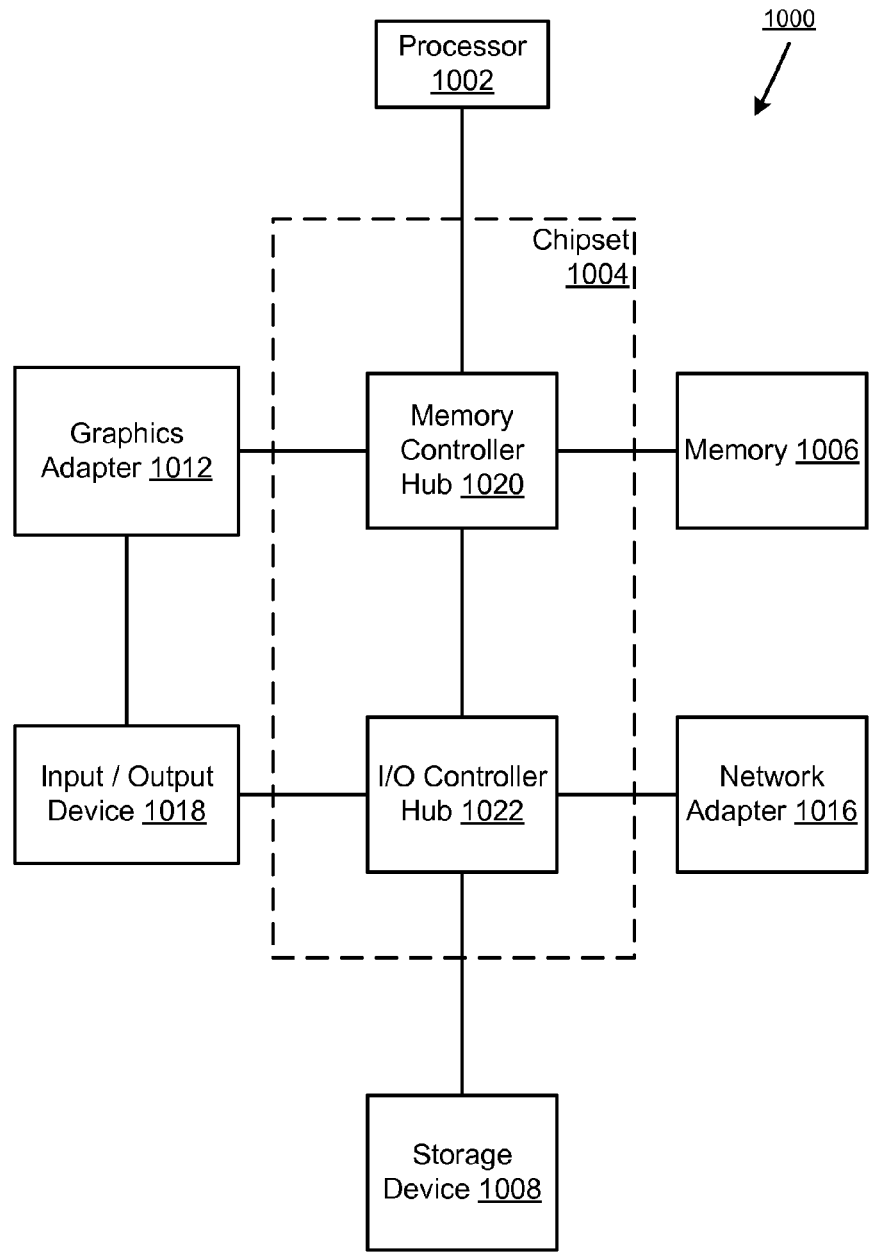
FIG. 10 is a block diagram illustrating an example computing device for use as a host device and/or as a mobile device.

FIG. 10 is a block diagram illustrating an example computing device 1000 for use as the host device 110 and/or as the mobile device 120. Illustrated are at least one processor 1002 coupled to a bus 1004. Also coupled to the bus 1004 are a memory 1006, a non-transitory storage device 1008, a graphics adapter 1012, input device 1018 and a network adapter 1016. The processor 1002 can be any type of general-purpose processor such as an INTEL x86 or APPLE A4 compatible CPU. The storage device 1008 can be, in some embodiments, a hard disk drive but can also be another device capable of storing data, such as a writeable compact disk (CD) or DVD, and/or a solid-state memory device. The memory 1006 may be, for example, firmware, read-only memory (ROM), non-volatile random access memory (NVRAM), and/or RAM, and holds instructions and data used by the processor 1002. The type of input device 1018 can vary depending upon the embodiment. For example, if the computing device 1000 is a host device the input device can include a keyboard and/or mouse. If the computing device 1000 is a mobile device the input device can include a touch-sensitive display in addition to a keyboard, mouse or other peripheral devices (e.g., drawing devices). In some embodiments, the graphics adapter 1012 can be configured to display images and other information on a display, such as a traditional monitor or a touch-sensitive display. The network adapter 1016 can be used to communicate via the communication link 105. The system 1000 can be configured to execute one or more computer program modules. In some embodiments, a module can be a computer program logic and/or data for providing specified functionality. In some embodiments, a module can be implemented in hardware, firmware, and/or software. In some embodiments, the modules can be stored on the storage device 1008, loaded into the memory 1006, and/or executed by the processor 1002.

In some embodiments, one or more portions of the components shown in the computing devices (e.g., host devices, mobile devices) above can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the interaction combination module 210 shown in FIG. 2 can be, or can include, a software module configured for execution by at least one processor (not shown). In some embodiments, the functionality of the components can be included in different modules and/or components than those shown above. For example, although not shown, the functionality one or more portions of the application delegation module 725 shown in FIG. 7 can be included in different modules than the application delegation module 725, or divided into several different modules (not shown).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. In some implementations, a computer-readable storage medium can store instructions that when executed can cause a processor (e.g., a processor of a mobile device, a processor of a host device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Process steps may be performed by one or more programmable processors executing a computer program to perform functions by operating on input data and generating output. Process steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory computer-readable storage medium storing instructions that when executed cause a mobile device to perform a process, the instructions comprising instructions to:

establish a portion of a communication link with a host device;

receive, at the mobile device, an instance of at least a portion of a user interface operating at the host device, the instance including data, and the user interface associated with an application operating at the host device;

display, at the mobile device, the instance of at least a portion of the user interface on a touch-sensitive display of the mobile device;

receive a first signal at the mobile device, the first signal produced by a pressure-sensitive drawing device, and indicative of a level of pressure of at least a portion of the pressure-sensitive drawing device interacting with a surface of the touch-sensitive display;

receive a second signal at the mobile device, the second signal produced by the touch-sensitive display, and indicative of the interaction of the pressure-sensitive drawing device with the surface of the touch-sensitive display;

process, at the mobile device, the first signal received from the pressure-sensitive drawing device and the second signal received from the touch-sensitive display to thereby produce a third signal based on a combination of the first signal and the second signal;

send, via the portion of the communication link, the third signal to the host device;

receive, at the mobile device, an updated instance of at least a portion of the user interface operating at the host device, the updated instance including an addition to the data, the addition being based on the third signal, and the host device using the third signal to display an image in the user interface operating at the host device, the image having characteristics dependent on the level of pressure; and display, at the mobile device, the updated instance of at least a portion of the user interface on the touch-sensitive display of the mobile device, wherein:
the application operating at the host device is a drawing application,
the user interface associated with the application is a drawing interface, and
the characteristics of the image dependent on the level of pressure are at least one of a line thickness, translucence, shading consistency, or color.

2. The non-transitory computer-readable storage medium of claim 1, wherein the instance of the at least the portion of the user interface mirrors a portion of the user interface operating at the host device.

3. The non-transitory computer-readable storage medium of claim 1, wherein the instance of the user interface is duplicated from only a portion of the user interface operating at the host device and has a resolution different from a resolution of the user interface operating at the host device.

4. The non-transitory computer-readable storage medium of claim 1, wherein the touch-sensitive display of the mobile device is configured to function as an input/output (I/O) device for the host device.

5. The non-transitory computer-readable storage medium of claim 1, further comprising instructions to:
receive, at the mobile device, at least one of image rendering commands or accelerating commands at a display primitives layer from the host device.

6. The non-transitory computer-readable storage medium of claim 1, wherein the touch-sensitive display of the mobile device is configured to be registered at a display primitives layer of the host device.

7. The non-transitory computer-readable storage medium of claim 1, wherein the communication link is a wireless point-to-point communication link with the host device.

8. The non-transitory computer-readable storage medium of claim 1, wherein:
the second signal is indicative of a location of contact of at least a portion of the pressure-sensitive drawing device against the surface of the touch-sensitive display, the location of contact being within the instance of the portion of the user interface displayed on the touch-sensitive display; and
the image being displayed at a location in the user interface operating at the host device corresponding to the location of contact.

9. The non-transitory computer-readable storage medium of claim 1, wherein the third signal is at least one instruction executable by the application operating on the host device, the at least one instruction triggering at least one operation of the host device.

10. A computer-implemented method, comprising:
establishing a portion of a communication link with a mobile device;
sending, to the mobile device, an instance of at least a portion of a user interface operating at a host device, the instance including data, and the user interface associated with an application operating at the host device;
receiving, from a pressure-sensitive device via the portion of the communication link, a first signal produced by the pressure-sensitive device and representing a level of pressure of at least a portion of the pressure-sensitive drawing device interacting with a surface of a touch-sensitive display of the mobile device;
receiving, from the mobile device via the portion of the communication link, a second signal produced by the touch-sensitive display of the mobile device, and indicative of the interaction of the pressure-sensitive drawing device with the surface of the touch-sensitive display of the mobile device;
processing, at the host device, the first signal and the second signal to thereby produce at least one instruction executable by the application operating on the host device, the at least one instruction triggering at least one operation of the host device that produces an addition to the data;
processing, at the host device, the first signal and the second signal to thereby produce an image for display in a user interface operating at the host device, the image having characteristics dependent on the level of pressure; and
sending, by the host device to the mobile device, an updated instance of at least a portion of the user interface operating at the host device, the updated instance including the addition to the data, wherein:
the application operating at the host device is a drawing application,
the user interface associated with the application is a drawing interface, and
the characteristics of the image dependent on the level of pressure are at least one of a line thickness, translucence, shading consistency, or color.

11. The method of claim 10, further comprising:
receiving an indicator of a change in orientation of the mobile device, and wherein:
the sending of the updated instance of the at least the portion of the user interface is based on the indicator of the change in orientation of the mobile device, and
a resolution of the updated instance of the at least the portion of the user interface is different from a resolution of the instance of the at least the portion of the user interface.

12. The method of claim 10, wherein the instance of the at least the portion of the user interface is a customized instance of the at least the portion of the user interface adapted to a capability of the touch-sensitive display of the mobile device, the method further comprising:

generating the customized instance of the at least the portion of the user interface based on the user interface operating at the host device.

13. The method of claim 10, further comprising:

delegating a task from the host device to the mobile device responsive to the first signal produced by the pressure-sensitive device.

14. The computer-implemented method of claim 10, wherein the second signal produced by the touch-sensitive display represents a location of contact of at least a portion of the pressure-sensitive drawing device with the surface of the touch-sensitive display, the location of contact being within the instance of the portion of the user interface; and wherein the image being displayed at a location corresponding to the location of contact.

15. A non-transitory computer-readable storage medium storing instructions that when executed cause a mobile device to perform a process, the instructions comprising instructions to:

receive a first signal produced by a touch-sensitive display and representing an interaction of a pressure-sensitive drawing device at a location within the touch-sensitive display of the mobile device;

receive a second signal produced by the pressure-sensitive drawing device and representing a level of pressure of at least a portion of the pressure-sensitive drawing device against a surface of the touch-sensitive display;

receive, at the mobile device, an instance of at least a portion of a user interface operating at a host device, the user interface associated with an application operating at the host device; and define, based on the combination of the first signal and the second signal, at least a portion of an image simulating an interaction of a writing instrument type with the user interface, the image having characteristics dependent on the level of pressure; wherein:

the application operating at the host device is a drawing application, the user interface associated with the application is a drawing interface, and the characteristics of the image dependent on the level of pressure are at least one of a line thickness, translucence, shading consistency, or color.

16. The non-transitory computer-readable storage medium of claim 15, wherein the second signal includes an identifier of the writing instrument type, the instructions further comprising instructions to:

select, based on the identifier, a writing instrument definition file associated with the writing instruction type from a plurality of writing instrument definition files representing a plurality of writing instrument types at the mobile device, the image simulating the interaction being defined based on the writing instrument definition file.

17. The non-transitory computer-readable storage medium of claim 16, wherein the writing instrument definition file defines images associated with the pressure-sensitive drawing device.

18. The non-transitory computer-readable storage medium of claim 17, wherein the images include at least one of glyphs, lines, and characters.

19. The non-transitory computer-readable storage medium of claim 18, the instructions further comprising instructions to:

provide, to the host device, the first signal and the second signal, wherein, based on the combination of the first signal and the second signal, the application operating at the host device produces at least one instruction executable by the application operating on the host device, the at least one instruction triggering at least one operation of the host device.

20. The non-transitory computer-readable storage medium of claim 15, wherein the instance of the at least the portion of the user interface mirrors a portion of the user interface operating at the host device.

21. The non-transitory computer-readable storage medium of claim 15, wherein the second signal includes a plurality of parameter values defined based on an interface and characterizing the writing instrument type.

22. The non-transitory computer-readable storage medium of claim 15, wherein the touch-sensitive display of the mobile device is configured to be registered at a display primitives layer of the host device.

23. The non-transitory computer-readable storage medium of claim 15, wherein the portion of the image is displayed at the location within the touch-sensitive display.

* * * * *